Sept. 13, 1932.  S. SWITLIK  1,877,704
PILOT'S SAFETY BELT AND BUCKLE THEREFOR
Filed July 8, 1931
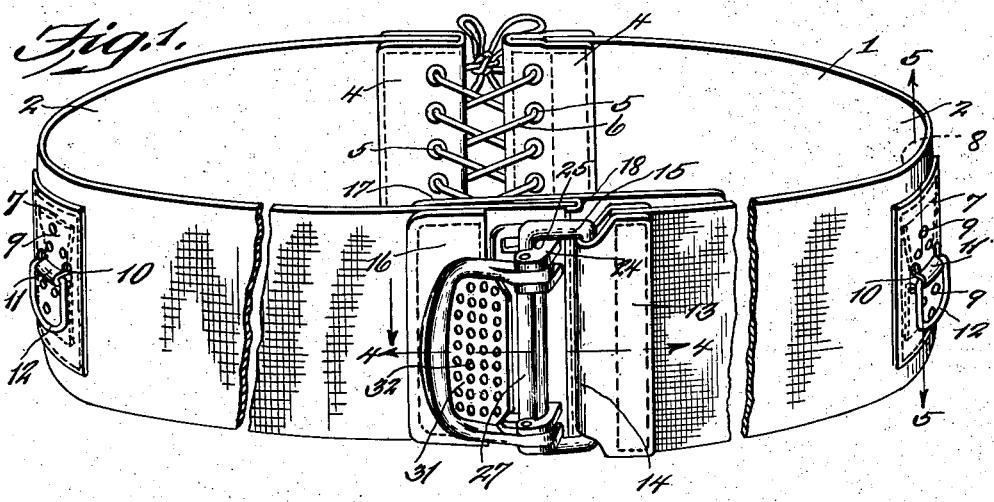
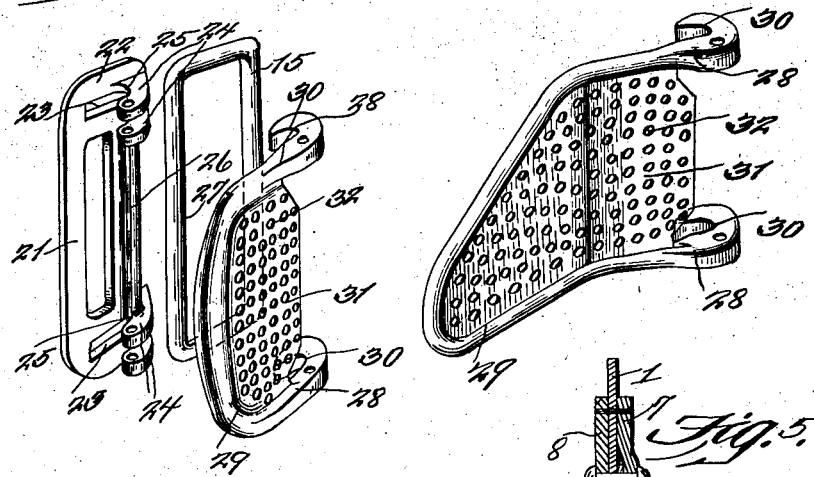
Stanley Switlik INVENTOR
BY Victor J. Evans
ATTORNEYS Patented Sept. 13, 1932

1,877,704

UNITED STATES PATENT OFFICE

STANLEY SWITLIK, OF TRENTON, NEW JERSEY

PILOT'S SAFETY BELT AND BUCKLE THEREFOR

Application filed July 8, 1931. Serial No. 549,542.

The present invention relates to safety belts for aircraft pilots, and more especially to an improved buckle for use in connection with the belt.

The majority of buckles now in use with pilot safety belts are not only more or less tedious and inconvenient to open when release of the pilot is necessary, but are very dangerous to the pilot's hands. In fact, most of the latches of buckles now used, while being quickly releasable, are open, in which case the pilot's fingers can be caught between and possibly severed when the catch loop of one end of the belt is being quickly released from its keeper by the latching member. In other words, the latching member of most of the buckles now used with safety belts are open, so that when the pilot is in the act of inserting the hand to open the latch, the fingers can be caught between the open latch and the catch loop, which will injure the fingers to a substantial degree, and possibly sever them.

The present invention has for its purpose to provide, in a buckle of this kind, a latch element which is substantially solid or closed throughout, which will prevent the fingers from passing through the latch and thereby be caught by the catch loop, thereby positively avoiding injury to the pilot's fingers.

It is obvious that the latch element may be any desired shape, either as shown in Figure 1, or as shown in Figure 3, or otherwise shaped, so as to prevent the fingers being caught between the latch element and the catch loop.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view in perspective of a pilot's safety belt.

Figure 2 discloses views of the keeper element, the latch element and the catch loop ready to be assembled.

Figure 3 is a view of another form of latch element, wherein it is elongated and more or less pointed.

Figure 4 is a sectional view on line 4—4 of Figure 1.

Figure 5 is a sectional view on line 5—5 of Figure 1.

Referring to the drawing 1 identifies a pilot's safety belt, which is usually of an extremely broad construction and made up of a heavily woven fabric, as illustrated in the drawing.

In the present construction of belt, it comprises two sections 2 and 3, and the rear separable ends of both sections are reinforced by heavy leather pieces 4, which have eyelets 5 for the reception of a heavy strand lacing 6, by which the two sections may be adjustably connected in order to fit waists of various sizes.

The sides of the two sections 2 and 3 have stitched thereto on the exterior and interior thereof heavy leather pieces 7 and 8. These pieces are also riveted, as shown at 9 to the sections. These rivets 9 also secure heavy plates 10 in position between the outer pieces 7 and the belt sections. The plates 10 have bearings 11 for the reception of the rings 12, into which chains, cables or other suitable strands not shown may be connected, and which in turn may be connected with the padded seat or the floor of the cockpit, so as to anchor the safety belt in place, and thereby prevent displacement of the pilot.

The forward end of the section 2 of the belt has stitched thereto a leather reinforcing 13, which is folded on itself, the fold 14 receiving the catch loop 15.

The front end of the section 3 of the belt has stitched to its exterior face a heavy leather reinforcing 16, and likewise stitched to the interior face is a second reinforcing 17. This reinforcing 17 constitutes a lapping element to underlap the adjacent end of the section 2, thereby preventing pinching of the pilot's wearing apparel between the ends of the two sections of the belt. The extreme edge of the front end of the section 3 is bound by a piece of leather or other reinforcing 18, to prevent fraying of the end edge of the belt section.

The leather reinforcing 16 has an extension 19, which is reduced in width to the remaining portion of the reinforcing. This extension is folded upon itself, and is fastened to the belt section by the same stitches which are used for securing the leather reinforcing 16 to the belt section. The fold 20 of the extension receives a transverse bar 21 of the keeper element 22. The ends of the keeper element are slotted as shown at 23, and projecting laterally from the ends of the keeper element are ears 24, which are spaced on opposite sides of the slots. Certain edges of these ears have recesses 25, which are semicircular, and connecting certain of the ears is a bar 26, which is semicircular in cross section to correspond with the semicircular recesses, the recesses and the semicircular bar acting as a seat for the transverse bar 27 of the catch loop, when engaged with the ears.

Pivoted between the ears are the arms 28 of the latch element 29. The arms 28 are of hook formation, the cavities 30 of which correspond to and register with the seat, when the latch element is closed. As shown in Figures 1 and 2 the latch element is of a broad extended shape, and throughout its area it is solid, as in a plate, and the solid or plate portion 31 of the latch element is provided with a plurality of perforations 32 in order to lighten the construction.

Heretofore such latch elements are of open design, in other words so constructed as to permit the fingers of the pilot to pass through. Obviously when such a construction is used, it is possible to catch the fingers between the transverse part of the latch element and a transverse part of the catch loop, which is very dangerous to the pilot's fingers, there having been instances where the fingers have been severed.

However, with this construction of solid or plate formation of latch element the pilot's fingers are prevented from being caught.

In Figure 3 the latch element is of a different shape or contour; that is, more or less elongated, the construction thereof also preventing the pilot's fingers from being caught.

When fastening the pilot's belt in position on the waist, the belt is passed around the waist, one end of the belt lapping the underlapping reinforcing, the latching element being inserted through the catch loop, and then by moving the latching element on its pivot, the catch loop slides on the latch element and into engagement with the seat of the keeper element. In order to quickly release the buckle, the latching element is pulled outwardly, its hooks engaging with the catch loop, thereby removing a transverse part of the catch loop from the seat sufficiently until the catch loop slides off and from engagement with the latching element, obviously it will be noted that the pilot's fingers are prevented from passing through the latching element and thereby avoiding injury to the pilot's fingers.

The invention having been set forth, what is claimed is:

1. The combination with a pilot's safety belt, of a keeper element permanently attached to one end of the belt and having a seat, said keeper element having spaced lugs, portions of which being incident to and constituting a part of the seat, a catch loop connected to the other end of the belt and having a transverse portion to engage said seat, a latch element pivoted between said lugs, said latch element having hooks corresponding to and registering with the seat, said latch element being of substantial width and having sides and an end, said latch element being insertable through the catch loop and adapted to ride thereon, to engage the catch loop in the keeper at the time the hooks of the latch element register with the seat, said latch element having a web integral with the sides and the end thereof for the prevention of the pilot's fingers being inserted between the latch element and the latch loop when disengaging the loop from the keeper seat.

2. The combination with a pilot's safety belt of substantial width, of a keeper element substantially corresponding in width to and attached to one end of the belt and having a seat of a length approximating the width of the element, the upper and lower ends of the seat having spaced lugs of shapes corresponding to and registering with the transverse area of the seat, a catch loop carried by the other end of the safety belt and adapted to engage said seat and said lugs, a latch element of a width approximating the length of the seat and pivoted between the lugs at the ends of the seat, said latch element provided with means for engaging with and moving a transverse part of the catch loop into and engaged with the seat, said latch element having sides and provided with a web formed integrally with the sides, and an end of the latch element acting to prevent accidental insertion of the pilot's fingers between the sides of the latch element and the catch loop, when the loop is being disengaged from the keeper seat.

3. The combination with a pilot's safety belt of substantial width, of a keeper approximating the substantial width of the belt and attached to one end thereof, said keeper element having a seat of a length approximating the width of the keeper, said keeper having lugs arranged in pairs at the upper and lower ends of the seat and spaced, said lugs being of shapes in certain of their edges corresponding to and registering with the cross sectional area of the seat, a catch loop to be carried by the other end of the belt and adapted to engage said seat, a latch element of substantial width having upper and lower side arms pivoted between the spaced lugs, the side arms of the latch element having means corresponding to the cross sectional shape of the seat for engaging with and moving a transverse portion of the catch loop into engagement with the seat, said latch element having a perforated web formed integral with the upper and lower side arms and acting to prevent accidental insertion of the pilot's fingers between the latch element and the catch loop, when the loop is being disengaged from the keeper seat.

4. In a belt buckle, a keeper element of substantial width characteristic of a pilot's safety belt and having a substantially elongated seat extending transversely and approximating the width of the element, said keeper element being attached to one end of the belt, an elongated catch loop of greater length than the seat and attached to the other end of the belt, a latch element of a substantially greater width than the elongated seat and having side arms, means at the upper and lower opposite ends of the elongated seat for pivotally mounting said arms, said arms having hooks corresponding to and registering with the seat, said hooks adapted to engage with a transverse part of the catch loop by inserting the latch element through the catch loop, for moving said transverse part into engagement with the seat, said latch element having a perforated web formed integral with the side arms of the latch element acting to prevent accidental insertion of the pilot's fingers between the latch element and the catch loop, when the loop is being disengaged from the keeper seat.

5. In a belt buckle, a keeper element of substantial width characteristic of a pilot's safety belt and being attached to one end of the belt, said keeper element having laterally extending L shaped ears, therefore provided with seats or recesses in certain of their edges, said ears being in pairs, one pair at one end of the keeper element, the other pair at the opposite end of the keeper element, said pairs of ears being substantially widely spaced, an elongated catch loop of a length just greater than the wide space between the remote ears of both parts, said catch loop being attached to the other end of the belt, a latch element of substantial width being substantially equal in width to the wide spacing of said pairs of ears and having extension arms pivoted between said pairs of ears, said arms merging into hooks having certain of their edges conforming to and adapted to register with the seats or recesses of the ears, whereby upon insertion of the latch element through the elongated catch loop, a transverse part of the catch loop may be positioned in the seats or recesses of the ears, said latch element being substantially solid throughout its substantial width, thereby preventing accidental insertion of the pilot's fingers between the latch element and the catch loop, when the loop is being disengaged from said ears.

In testimony whereof I affix my signature.

STANLEY SWITLIK.